UNITED STATES PATENT OFFICE.

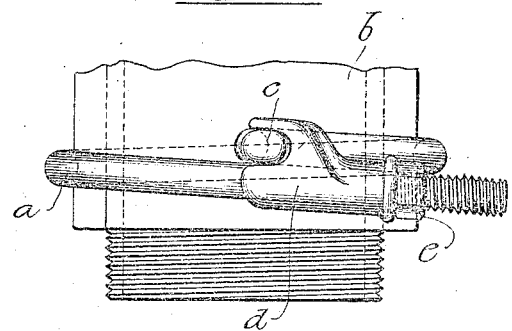
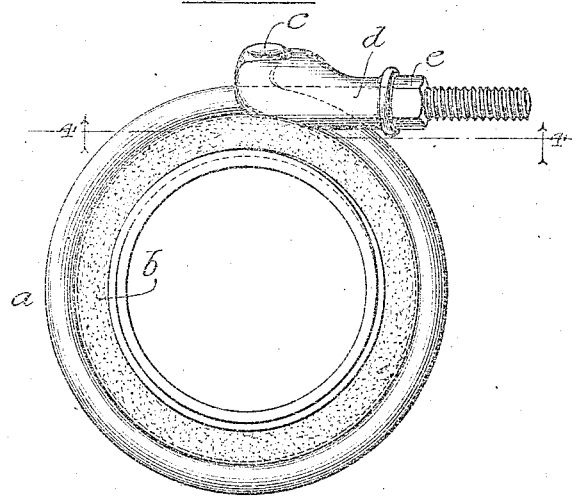
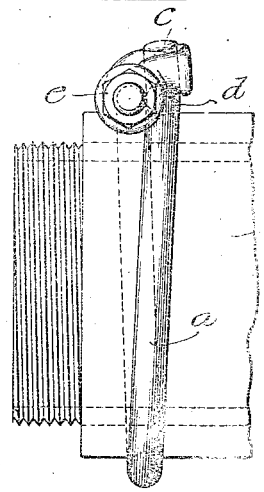
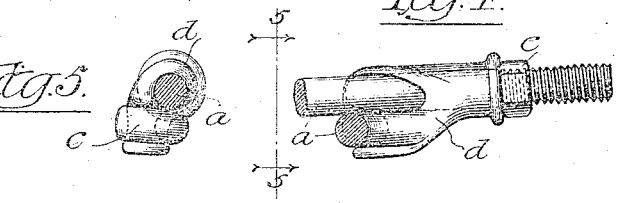

FRANK C. STUCKEL, OF RACINE, WISCONSIN, ASSIGNOR TO UNIVERSAL FASTENING COMPANY, OF RACINE, WISCONSIN, A CORPORATION.

CLAMP-BAND.

1,165,464.   Specification of Letters Patent.   Patented Dec. 28, 1915.

Application filed October 6, 1914. Serial No. 865,236.

*To all whom it may concern:*

Be it known that I, FRANK C. STUCKEL, a citizen of the United States, residing at Racine, in the county of Racine, State of Wisconsin, have invented certain new and useful Improvements in Clamp-Bands, of which the following is hereby declared to be a full, clear, and exact description.

The invention relates to clamp-bands used, for example, to fasten a section of hose pipe onto its threaded junction member.

The improvement comprises a body length of flexible wire to encircle the main tube spirally, such body having at one terminal an abruptly outturned head, and at the opposite, a straight stem or tail furnished with a sliding offset coupler to engage the head, said coupler being disposed at one side of the inner periphery of the clamp ring but shifting in curvilinear course at tangent contact with the tube or like cylindric object. A separate set nut conveniently adjusts the coupler on screwing the nut along the threaded end into firm thrust against the coupler.

On the drawings, Figure 1 is a plan view of the clamp-band in place about the pipe end to fasten the threaded union piece. Fig. 2 is an end view and Fig. 3 a view in side elevation of the same parts. Fig. 4 is a separate view of the inverted coupler with head and tail ends of the clamp-band cut across. Fig. 5 an elevation view in direction of the arrows, Fig. 4.

As shown by the drawings, the clamp-band comprises a body piece *a* generally of flexible wire, enough fully to encircle the main tube *b*, but ending at one terminal in an abruptly outturned head *c*, while the opposite end finishes in a straight stem or tail, along which slides a coupler *d* having an abutment notch at its front to encounter the outturned head *c* in offset relation just across from the point of tangent contact of the coupler *d* with the tube *b*, under stress of set nut *e* conveniently threaded to the stem to effect a push and pull strain on opposite termini of the encircling band *a*.

The coupler *d* is disposed at one side of the inner periphery of the clamp-band, its rounded nose taking purchase at successive tangent points in the band *a*, while said band compresses around the full curcuit, tighter and tighter, without cross ridge or indent sinking deeper and deeper that would render the joint defective, as in some earlier forms where the band circuit is incomplete.

Obviously, the tie-clip can be used to secure the staves of a barrel or tank instead of fastening a tube section to its threaded union piece, as shown.

Details of structure can be varied by the mechanics' skill without departure from the invention.

Having thus described my invention what I claim as new and desire to secure by Letters Patent, is:—

1. An improved clamp-band, comprising a body length of flexible wire to encircle the main tube spirally, such body length having an abruptly outturned head at one end and a straight tail at the opposite end, with an adjustable coupler slidably mounted on said tail to engage said outturned head, said coupler being disposed at one side of the inner periphery of the band and approximately in tangent contact with the clamped tube.

2. An improved clamp-band, comprising a body length of flexible wire to encircle the main tube spirally, such body length having an abruptly outturned head at one end and a straight threaded tail at the opposite end, with an adjustable coupler slidably mounted on said tail to engage said outturned head, said coupler being disposed at one side of the inner periphery of the band and approximately in tangent contact with the clamped tube, and an adjustable nut to shift said coupler in a course tangential to the tube when the clamp-band is in operative position.

FRANK C. STUCKEL.

Witnesses:
J. G. ANDERSON,
JAMES H. PEIRCE.